United States Patent
Jung et al.

(10) Patent No.: US 10,292,200 B2
(45) Date of Patent: May 14, 2019

(54) METHOD FOR TERMINAL MANAGING CONFIGURATION FOR DEVICE-TO-DEVICE (D2D) OPERATION IN WIRELESS COMMUNICATION SYSTEM, AND TERMINAL USING SAME

(71) Applicant: LG Electronics Inc., Seoul (KR)

(72) Inventors: Sunghoon Jung, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 137 days.

(21) Appl. No.: 15/510,444

(22) PCT Filed: Sep. 30, 2015

(86) PCT No.: PCT/KR2015/010314
§ 371 (c)(1),
(2) Date: Mar. 10, 2017

(87) PCT Pub. No.: WO2016/048114
PCT Pub. Date: Mar. 31, 2016

(65) Prior Publication Data
US 2017/0311375 A1    Oct. 26, 2017

Related U.S. Application Data

(60) Provisional application No. 62/056,482, filed on Sep. 27, 2014, provisional application No. 62/060,982, filed on Oct. 7, 2014.

(51) Int. Cl.
*H04W 76/27*    (2018.01)
*H04W 76/10*    (2018.01)
*H04W 76/30*    (2018.01)
*H04W 36/08*    (2009.01)
*H04W 76/25*    (2018.01)
(Continued)

(52) U.S. Cl.
CPC .......... *H04W 76/27* (2018.02); *H04W 36/08* (2013.01); *H04W 76/10* (2018.02); *H04W 76/25* (2018.02); *H04W 76/30* (2018.02); *H04W 48/20* (2013.01); *H04W 76/19* (2018.02); *H04W 76/23* (2018.02); *H04W 92/18* (2013.01)

(58) Field of Classification Search
CPC ..... H04W 76/27; H04W 76/10; H04W 76/23; H04W 76/25; H04W 76/30; H04W 76/19; H04W 36/08; H04W 92/18; H04W 48/20
See application file for complete search history.

(56) References Cited

U.S. PATENT DOCUMENTS

2012/0213183 A1    8/2012    Chen et al.
2013/0223353 A1    8/2013    Lu et al.
2016/0057795 A1*   2/2016    Kim ..................... H04W 76/14
                                                        370/329

OTHER PUBLICATIONS

3GPP TS 36.304 V8 5.0, Release 8, Mar. 2009, pp. 1-30.
(Continued)

*Primary Examiner* — Jianye Wu
(74) *Attorney, Agent, or Firm* — Dentons US LLP

(57) ABSTRACT

Provided are a method for a terminal managing a configuration for a device-to-device (D2D) operation in a wireless communication system, and a terminal using the method. The method is characterized by receiving a D2D configuration for a D2D operation from a network, and maintaining the D2D configuration for the D2D operation without releasing same when leaving the radio resource control (RRC) connected state.

10 Claims, 20 Drawing Sheets

(51) Int. Cl.
   *H04W 92/18*  (2009.01)
   *H04W 48/20*  (2009.01)
   *H04W 76/19*  (2018.01)
   *H04W 76/23*  (2018.01)

(56) References Cited

OTHER PUBLICATIONS

Qualcomm Incorporated et al., "Introduction of ProSe," R2-144542, 3GPP TSG-RAN WG2 #87Bis, Shanghai, China, Sep. 26, 2014, pp. 1-20.
ZTE, "On user inactivity of ProSe UE," R2-144478, 3GPP TSG-RAN WG2 #87Bis, Shanghai, China, Sep. 26, 2014, pp. 1-3.
Potevio, "Prose operation during mobility," R2-144446, 3GPP TSG-RAN WG2 #87Bis, Shanghai, China, Sep. 26, 2014, pp. 1-2.

\* cited by examiner

METHOD FOR TERMINAL MANAGING CONFIGURATION FOR DEVICE-TO-DEVICE (D2D) OPERATION IN WIRELESS COMMUNICATION SYSTEM, AND TERMINAL USING SAME

CROSS-REFERENCE TO RELATED APPLICATIONS

This application is the National Stage filing under 35 U.S.C. 371 of International Application No. PCT/KR2015/010314, filed on Sep. 30, 2015, which claims the benefit of U.S. Provisional Applications No. 62/056,482 filed on Sep. 27, 2014, and No. 62/060,982 filed on Oct. 7, 2014, the contents of which are all hereby incorporated by reference herein in their entirety.

BACKGROUND OF THE INVENTION

Field of the Invention

The present invention relates to a wireless communication system, more particularly a method of managing a configuration for a D2D operation performed by a UE in the wireless communication system and the UE using the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, 3$^{rd}$ Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D22) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

Meanwhile, the UE may be in an RRC connection state having a radio resource control (RRC) connection with the network, and may leave the RRC connection state for various reasons. For example, if the network releases an RRC connection or attempts to reestablish an RRC connection due to poor state of a wireless link with the network, then the UE may leave the RRC connection state.

According to prior art, when the UE leaves the RRC connection state, the UE releases all the radio resources that have been configured to the UE. For example, the UE releases a media access control (MAC) configuration for the established radio bearers and the associated Packet Data Convergence Protocol (PDCP) entity and releases the radio link control (RLC) entity.

According to such prior art, when the UE leaves the RRC connection state, the configuration for the D2D operation will also be released. As a result, the continuity of the D2D operation may not be guaranteed for the UE leaving the RRC connection state.

SUMMARY OF THE INVENTION

Technical aspect which is to be solved in the present invention is to provide a method of managing a configuration on a D2D operation performed by a UE in a wireless communication system and the UE using the method.

In one aspect, provided is a method for managing a configuration for device-to-device (D2D) operation of a user equipment (UE) in a wireless communication system. The method comprising receiving a D2D configuration on the D2D operation from a network and maintaining, without releasing, the D2D configuration on the D2D operation, when leaving a RRC (radio resource control) connection state.

The method may further comprise determining whether a condition to transit from the RRC connection state to another state is satisfied, and wherein the condition is characterized in that the network releases the RRC connection on the UE, or the UE fails a RRC connection reconfiguration with the network.

The D2D operation may be performed by applying the maintained D2D configuration until the UE selects a specific cell and receives system information on a D2D operation from the selected specific cell.

A cell which does not provide system information on a D2D operation may be barred, in selecting the specific cell.

The specific cell may be selected from cells which provide system information on a D2D operation.

When the UE leaves a RRC connection state, a timer may be started, and the UE may perform a D2D operation by applying the D2D configuration only for a time duration indicated by the timer.

The network may provide an additional D2D configuration other than the D2D configuration, and the additional D2D configuration may be available to use after the UE releases a RRC connection state.

The D2D operation may be a D2D communication.

In another aspect, provided is a user equipment (UE). The UE includes a radio frequency (RF) unit configured to transmit and receive a wireless signal and a processor operatively connected to the RF unit and configured to be operated. The processor further configured to: receive a D2D configuration on a D2D operation from a network; and maintain, without releasing, the D2D configuration on the D2D operation, when leaving a RRC (radio resource control) connection state.

According to the present invention, continuity of the D2D operation may be guaranteed even if the UE leaves the RRC connection state while performing the D2D operation. Reliability is very important when D2D operation is used for public safety, and the present invention may increase the reliability of such D2D operation.

DESCRIPTION OF EXEMPLARY EMBODIMENTS

Figure 1:
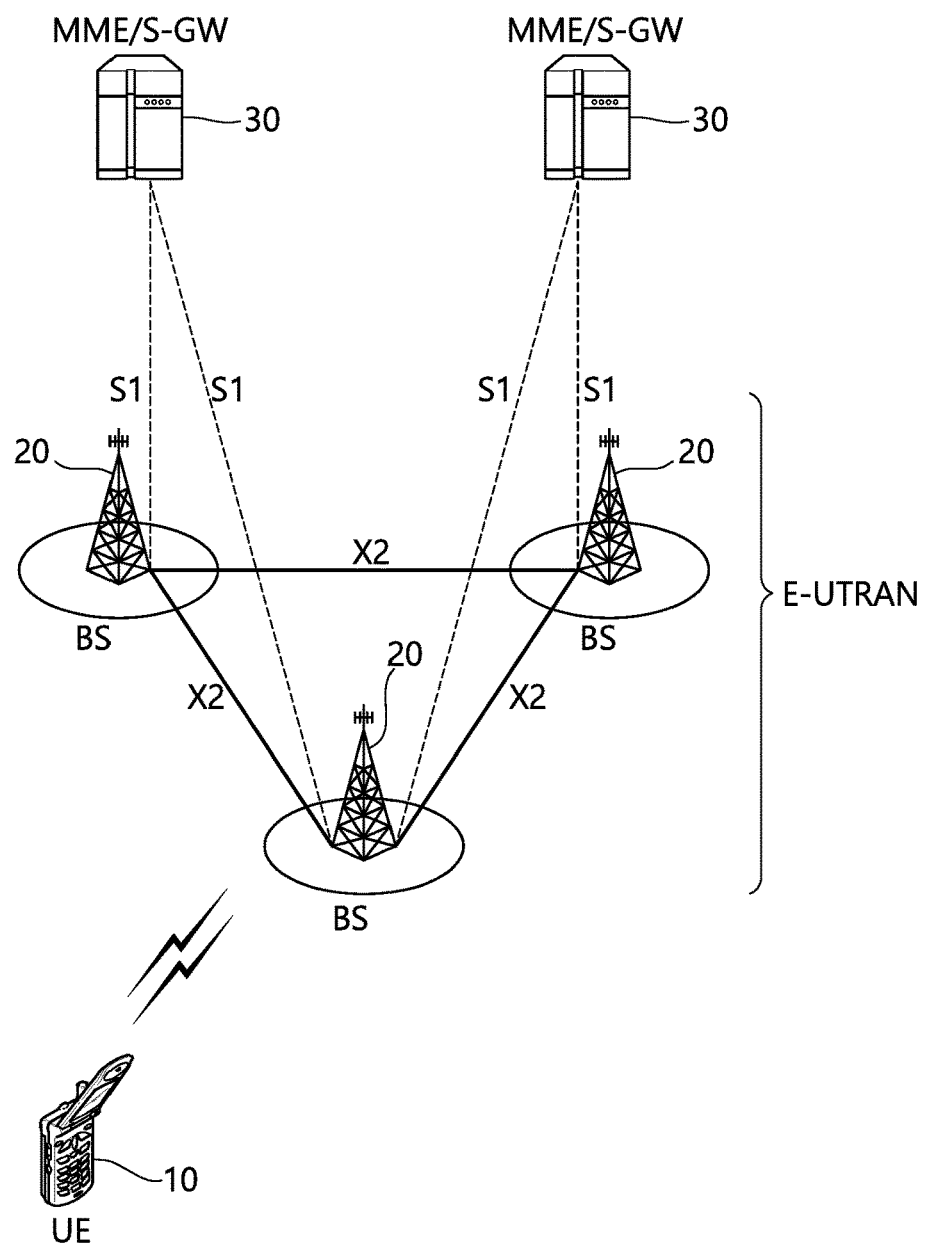
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
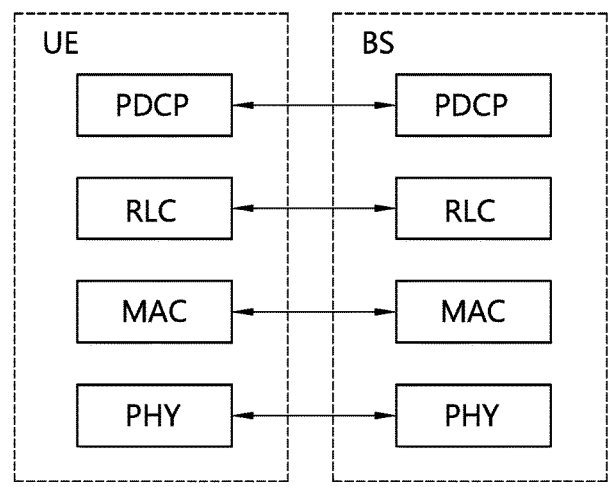
FIG. 2 is a diagram showing a wireless protocol architecture for a user plane.
Figure 3:
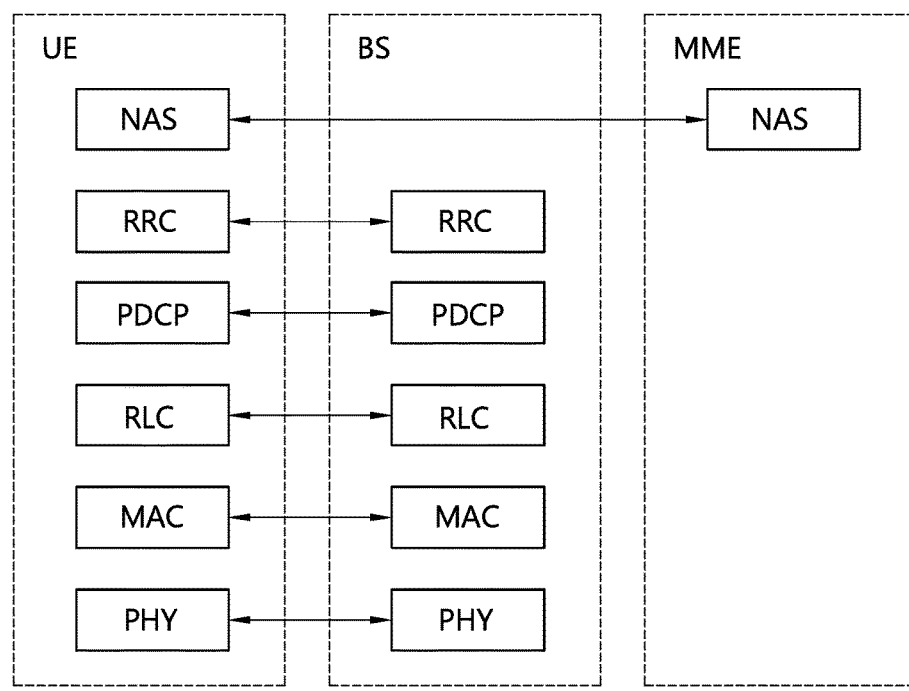
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include the limited number of parameters which are the most essential and are most frequently transmitted in order to obtain other information from a cell. UE first discovers an MIB after downlink synchronization. The MIB may include information, such as a downlink channel bandwidth, a PHICH configuration, an SFN supporting synchronization and operating as a timing reference, and an eNB transmission antenna configuration. The MIB may be broadcasted on a BCH. SystemInformationBlockType1 (SIB1) of included SIBs is included in a "SystemInformationBlockType1" message and transmitted. Other SIBs other than the SIB1 are included in a system information message and transmitted. The mapping of the SIBs to the system information message may be flexibly configured by a scheduling information list parameter included in the SIB1. In this case, each SIB is included in a single system information message. Only SIBs having the same scheduling required value (e.g. period) may be mapped to the same system information message. Furthermore, SystemInformationBlockType2 (SIB2) is always mapped to a system information message corresponding to the first entry within the system information message list of a scheduling information list. A plurality of system information messages may be transmitted within the same period. The SIB1 and all of the system information messages are transmitted on a DL-SCH.

In addition to broadcast transmission, in the E-UTRAN, the SIB1 may be channel-dedicated signaling including a parameter set to have the same value as an existing set value. In this case, the SIB1 may be included in an RRC connection re-establishment message and transmitted.

The SIB1 includes information related to UE cell access and defines the scheduling of other SIBs. The SIB1 may include information related to the PLMN identifiers, Tracking Area Code (TAC), and cell ID of a network, a cell barring state indicative of whether a cell is a cell on which UE can camp, a required minimum reception level within a cell which is used as a cell reselection reference, and the transmission time and period of other SIBs.

The SIB2 may include radio resource configuration information common to all types of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and for detecting a change of system information to only a PCell. In an SCell, when the corresponding SCell is added, the E-UTRAN may provide all types of system information related to an RRC connection state operation through dedicated signaling. When system information related to a configured SCell is changed, the E-UTRAN may release a considered SCell and add the considered SCell later. This may be performed along with a single RRC connection re-establishment message. The E-UTRAN may set a value broadcast within a considered SCell and other parameter value through dedicated signaling.

UE needs to guarantee the validity of a specific type of system information. Such system information is called required system information. The required system information may be defined as follows.

If UE is in the RRC_IDLE state: the UE needs to have the valid version of the MIB and the SIB1 in addition to the SIB2 to SIB8. This may comply with the support of a considered RAT.

If UE is in the RRC connection state: the UE needs to have the valid version of the MIB, SIB1, and SIB2.

In general, the validity of system information may be guaranteed up to a maximum of 3 hours after being obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
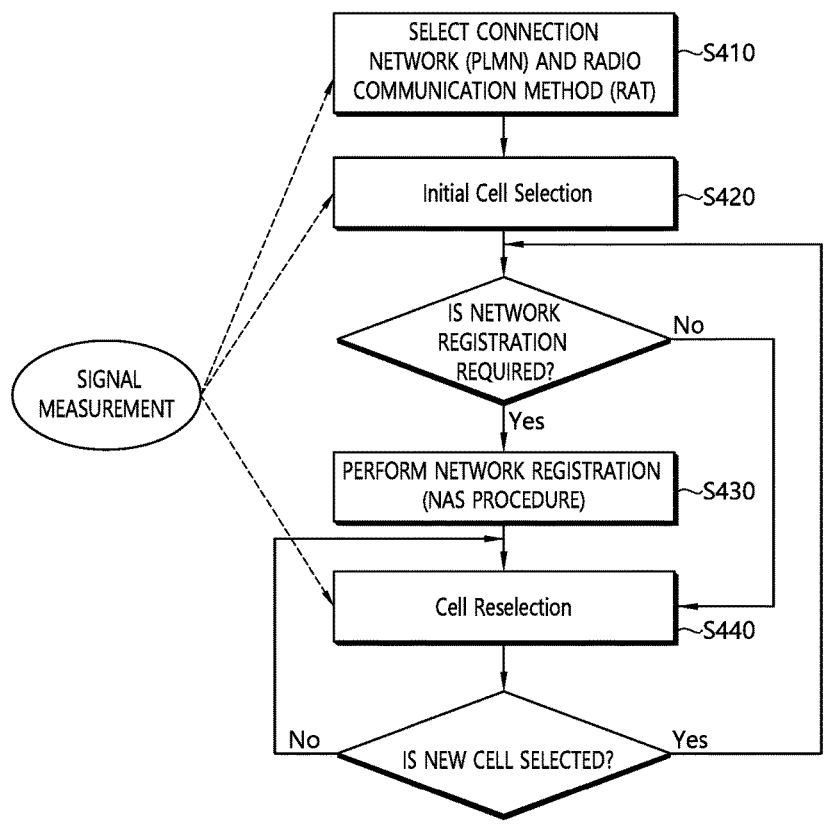
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
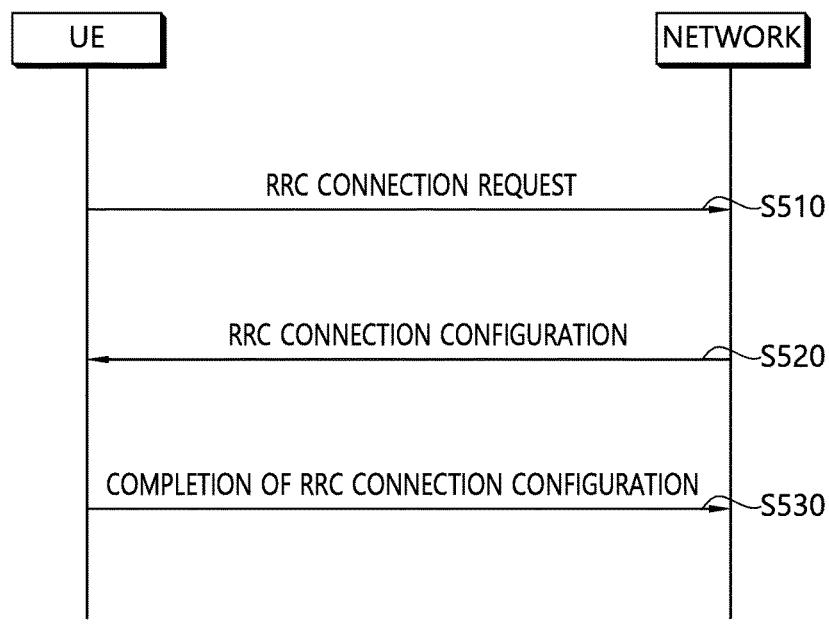
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
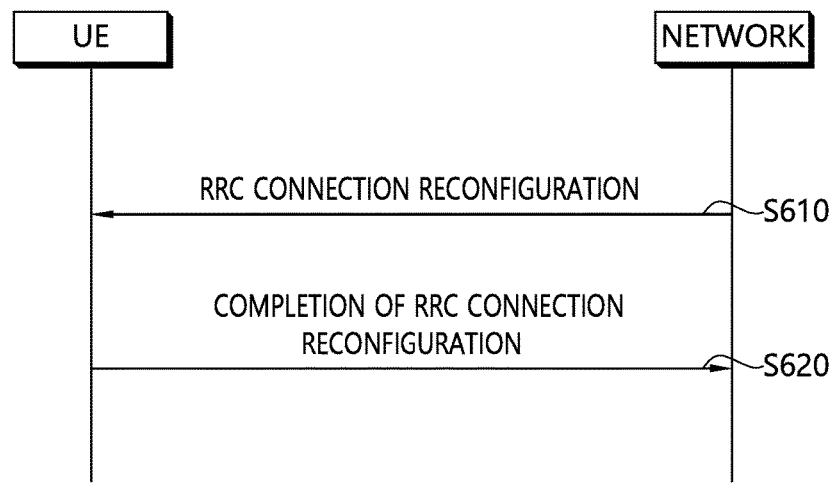
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC).

Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009 March) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

The cell selection criterion may be defined as below equation 1.

$$Srxlev > 0 \text{ AND } Squal > 0$$

where:

$$Srxlev = Q_{rxlevmeas} - (Q_{rxlevmin} + Q_{rxlevminoffset}) - Pcompensation$$

$$Squal = Q_{qualmeas} - (Q_{qualmin} + Q_{qualminoffset}) \quad \text{[Equation 1]}$$

Here, the variables in the equation 1 may be defined as below table 1.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as PEMAX in [TS 36.101] |
| $P_{PowerClass}$ | Maximum RF output power of the UE (dBm) according to the UE power class as defined in [TS 36.101] |

Signalled values, i.e., $Q_{rxlevminoffset}$ and $Q_{qualminoffset}$, may be applied to a case where cell selection is evaluated as a result of periodic search for a higher priority PLMN during a UE camps on a normal cell in a VPLMN. During the periodic search for the higher priority PLMN as described above, the UE may perform the cell selection evaluation by using parameter values stored in other cells of the higher priority PLMN.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 2.

$$Rs = Qmeas,s + Qhyst, Rn = Qmeas,s - Qoffset \quad \text{[Equation 2]}$$

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
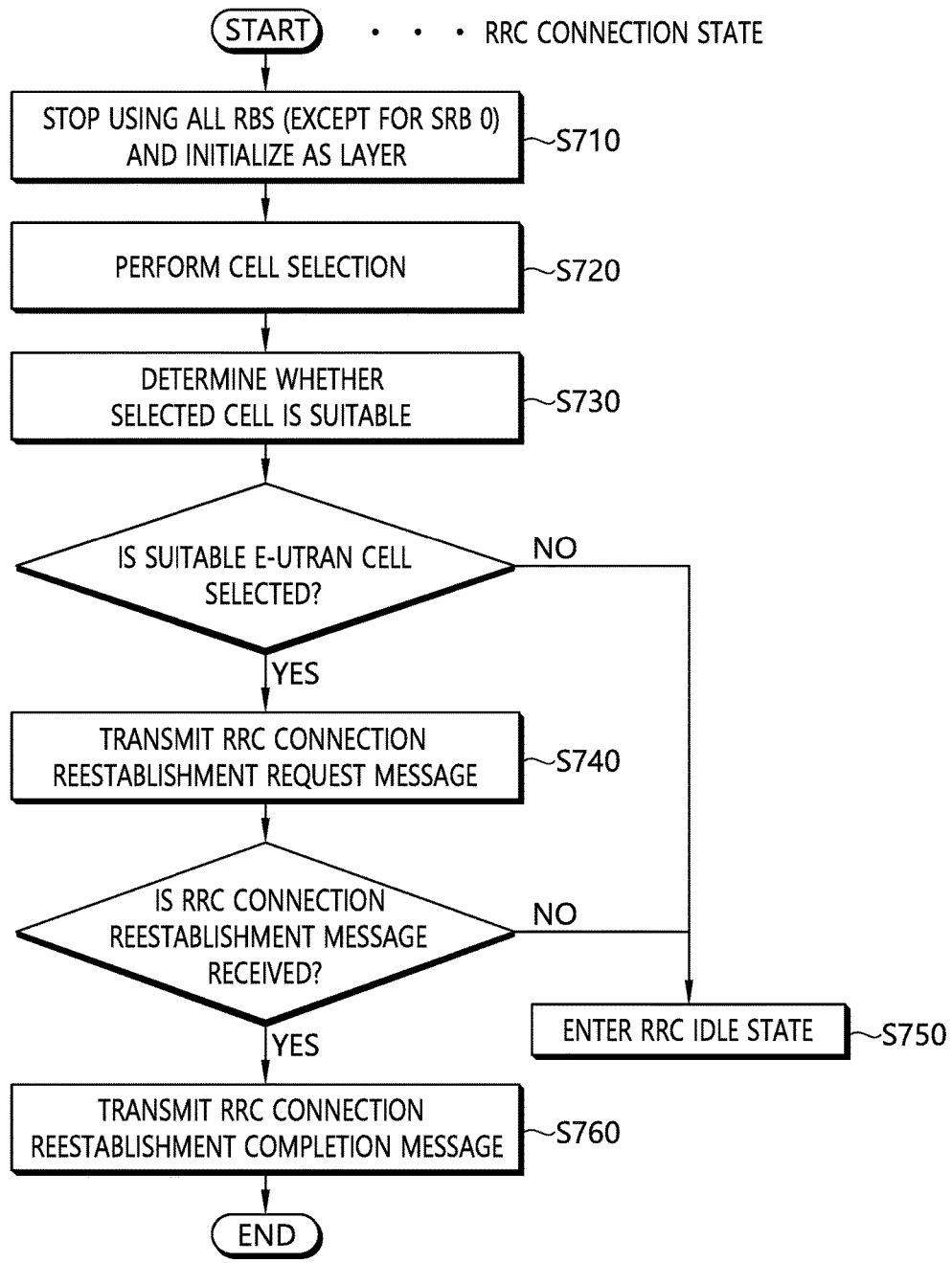
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
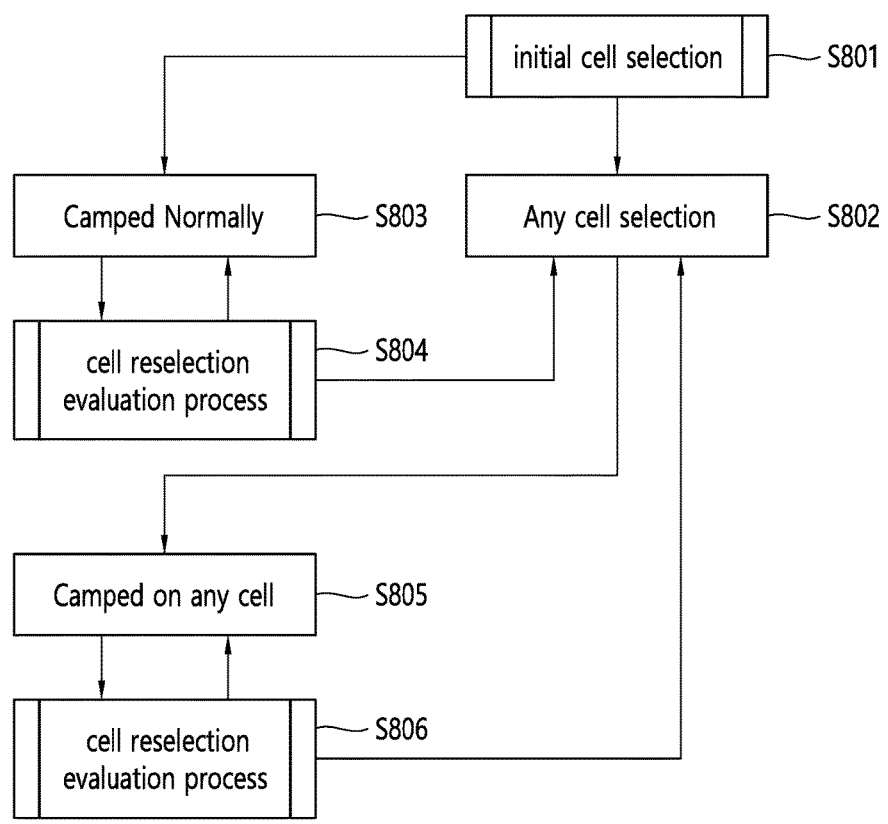
FIG. 8 illustrates substates which may be owned by UE in the RRC_IDLE state and a substate transition process.

FIG. 8 illustrates substates which may be owned by UE in the RRC_IDLE state and a substate transition process.

Referring to FIG. 8, UE performs an initial cell selection process (S801). The initial cell selection process may be performed when there is no cell information stored with respect to a PLMN or if a suitable cell is not discovered.

If a suitable cell is unable to be discovered in the initial cell selection process, the UE transits to any cell selection state (S802). The any cell selection state is the state in which the UE has not camped on a suitable cell and an acceptable cell and is the state in which the UE attempts to discover an acceptable cell of a specific PLMN on which the UE may camp. If the UE has not discovered any cell on which it may camp, the UE continues to stay in the any cell selection state until it discovers an acceptable cell.

If a suitable cell is discovered in the initial cell selection process, the UE transits to a normal camp state (S803). The normal camp state refers to the state in which the UE has camped on the suitable cell. In this state, the UE may select and monitor a paging channel based on information provided through system information and may perform an evaluation process for cell reselection.

If a cell reselection evaluation process (S804) is caused in the normal camp state (S803), the UE performs a cell reselection evaluation process (S804). If a suitable cell is discovered in the cell reselection evaluation process (S804), the UE transits to the normal camp state (S803) again.

If an acceptable cell is discovered in the any cell selection state (S802), the UE transmits to any cell camp state (S805). The any cell camp state is the state in which the UE has camped on the acceptable cell.

In the any cell camp state (S805), the UE may select and monitor a paging channel based on information provided through system information and may perform the evaluation process (S806) for cell reselection. If an acceptable cell is not discovered in the evaluation process (S806) for cell reselection, the UE transits to the any cell selection state (S802).

Now, a device-to-device (D2D) operation is described. In 3GPP LTE-A, a service related to the D2D operation is called a proximity service (ProSe). Now, the ProSe is described. Hereinafter, the ProSe is the same concept as the D2D operation, and the ProSe and the D2D operation may be used without distinction.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 9:
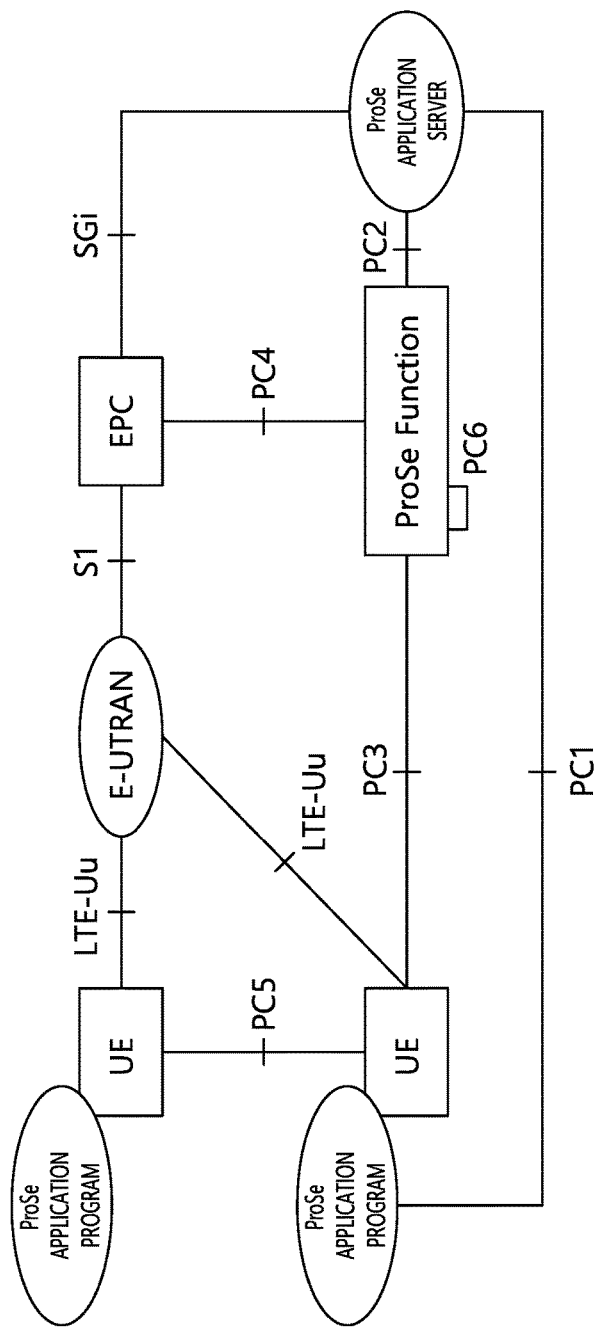
FIG. 9 shows a basic structure for ProSe.

FIG. 9 shows a basic structure for ProSe.

Referring to FIG. 9, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications

Authorization and configuration of UE for discovery and direct communication

Enable the functionality of EPC level ProSe discovery

ProSe related new subscriber data and handling of data storage, and also handling of the ProSe identities Security related functionality Provide control towards the EPC for policy related functionality Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

<ProSe Direct Communication>

ProSe direct communication is communication mode in which two types of public safety UE can perform direct communication through a PC 5 interface. Such communication mode may be supported when UE is supplied with services within coverage of an E-UTRAN or when UE deviates from coverage of an E-UTRAN.

Figure 10:
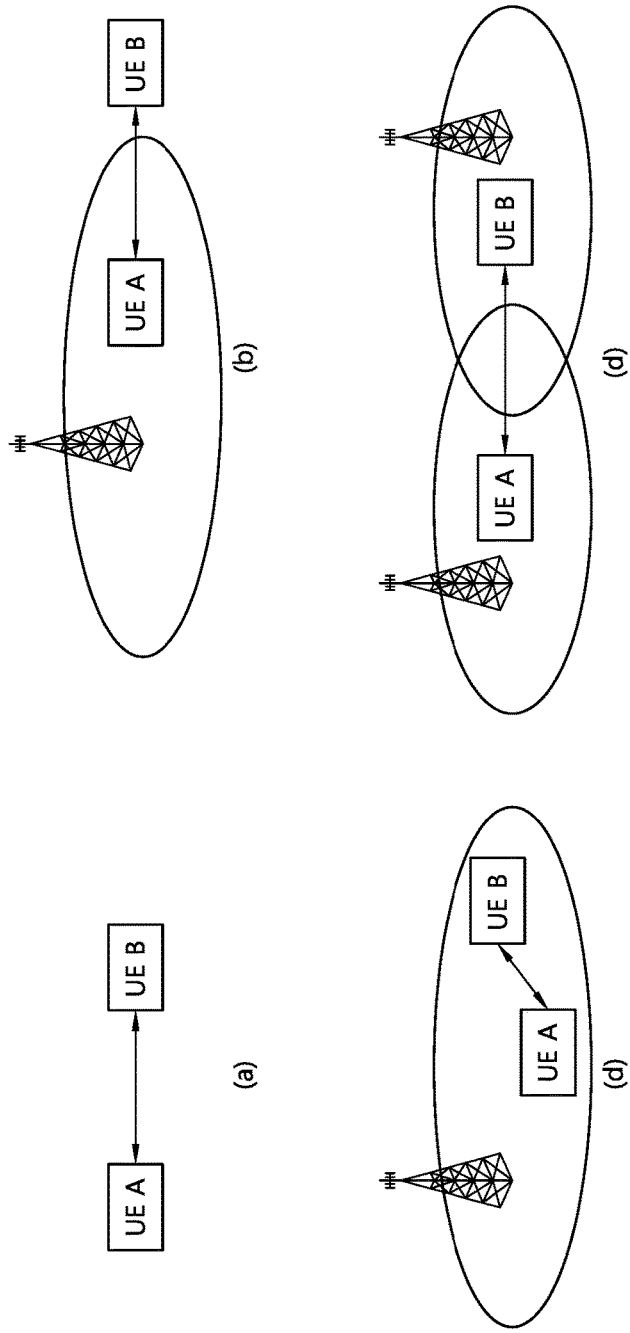
FIG. 10 shows the deployment examples of types of UE performing ProSe direct communication and cell coverage.

FIG. 10 shows the deployment examples of types of UE performing ProSe direct communication and cell coverage.

Referring to FIG. 10(a), types of UE A and B may be placed outside cell coverage. Referring to FIG. 10(b), UE A may be placed within cell coverage, and UE B may be placed outside cell coverage. Referring to FIG. 10(c), types of UE A and B may be placed within single cell coverage. Referring to FIG. 10(d), UE A may be placed within coverage of a first cell, and UE B may be placed within coverage of a second cell.

ProSe direct communication may be performed between types of UE placed at various positions as in FIG. 10.

Meanwhile, the following IDs may be used in ProSe direct communication.

A source layer-2 ID: this ID identifies the sender of a packet in the PC 5 interface.

A destination layer-2 ID: this ID identifies the target of a packet in the PC 5 interface.

An SA L1 ID: this ID is the ID of scheduling assignment (SA) in the PC 5 interface.

Figure 11:
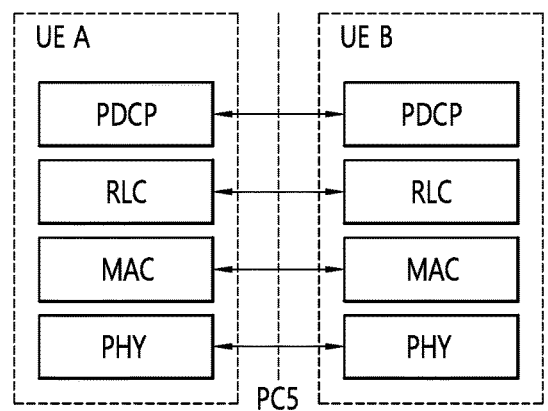
FIG. 11 shows a user plane protocol stack for ProSe direct communication.

FIG. 11 shows a user plane protocol stack for ProSe direct communication.

Referring to FIG. 11, the PC 5 interface includes a PDCH, RLC, MAC, and PHY layers.

In ProSe direct communication, HARQ feedback may not be present. An MAC header may include a source layer-2 ID and a destination layer-2 ID.

<Radio Resource Assignment for ProSe Direct Communication>

ProSe-enabled UE may use the following two types of mode for resource assignment for ProSe direct communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<ProSe Direct Discovery>

ProSe direct discovery refers to a procedure that is used for ProSe-enabled UE to discover another ProSe-enabled UE in proximity and is also called D2D direct discovery. In this case, E-UTRA radio signals through the PC 5 interface may be used. Information used in ProSe direct discovery is hereinafter called discovery information.

Figure 12:
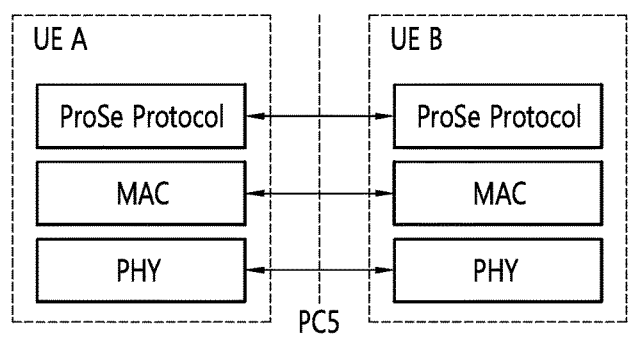
FIG. 12 shows the PC 5 interface for D2D direct discovery.

FIG. 12 shows the PC 5 interface for D2D direct discovery.

Referring to FIG. 12, the PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement.

The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration for discovery information announcement to types of UE. The configuration may be signaled through the SIB.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner. UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Figure 13:
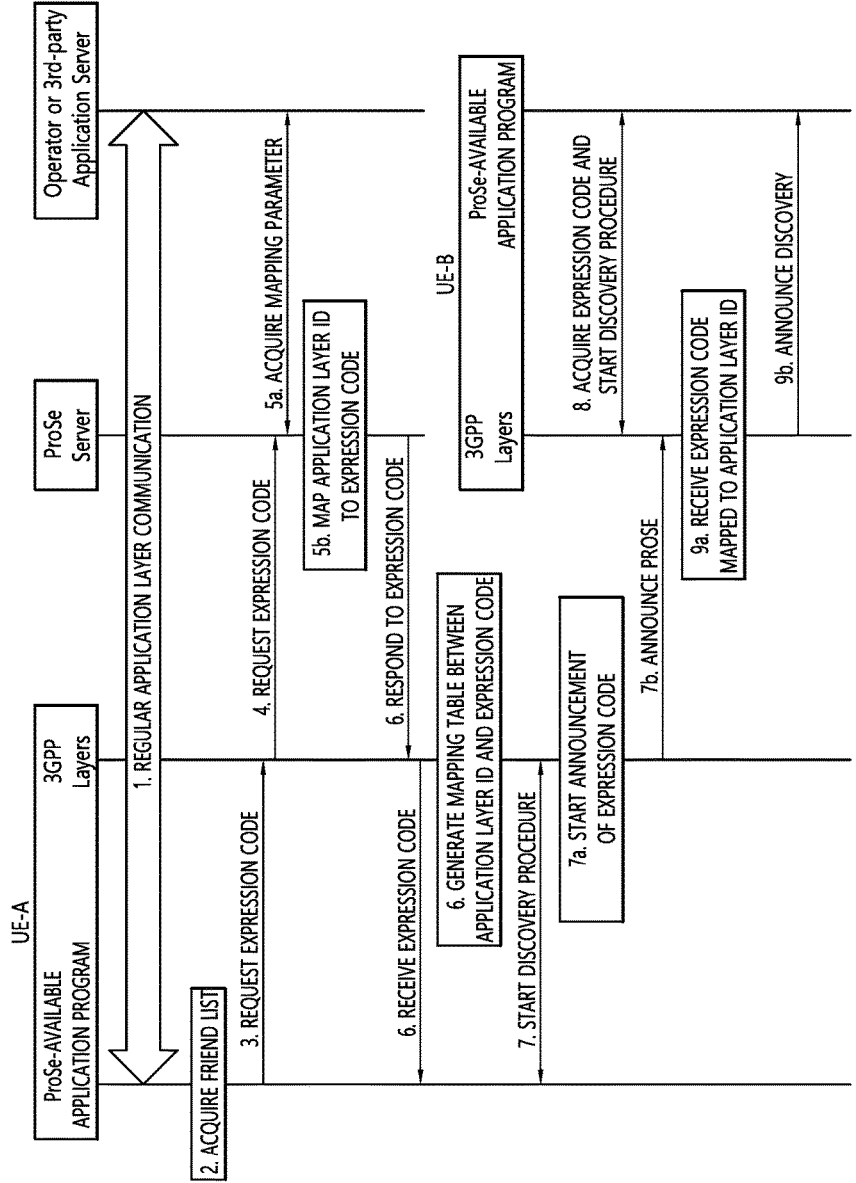
FIG. 13 is an embodiment of a ProSe discovery process.

FIG. 13 is an embodiment of a ProSe discovery process.

Referring to FIG. 13, it is assumed that UE A and UE B have ProSe-enabled application programs managed therein and have been configured to have a 'friend' relation between them in the application programs, that is, a relationship in which D2D communication may be permitted between them. Hereinafter, the UE B may be represented as a 'friend' of the UE A. The application program may be, for example, a social networking program. '3GPP Layers' correspond to the functions of an application program for using ProSe discovery service, which have been defined by 3GPP.

Direct discovery between the types of UE A and B may experience the following process.

1. First, the UE A performs regular application layer communication with the APP server. The communication is based on an Application Program Interface (API).

2. The ProSe-enabled application program of the UE A receives a list of application layer IDs having a 'friend' relation. In general, the application layer ID may have a network access ID form. For example, the application layer ID of the UE A may have a form, such as "adam@example.com."

3. The UE A requests private expressions code for the user of the UE A and private representation code for a friend of the user.

4. The 3GPP layers send a representation code request to the ProSe server.

5. The ProSe server maps the application layer IDs, provided by an operator or a third party APP server, to the private representation code. For example, an application layer ID, such as adam@example.com, may be mapped to private representation code, such as "GTER543 #2FSJ67DFSF." Such mapping may be performed based on parameters (e.g., a mapping algorithm, a key value and so on) received from the APP server of a network.

6. The ProSe server sends the types of derived representation code to the 3GPP layers. The 3GPP layers announce the successful reception of the types of representation code for the requested application layer ID to the ProSe-enabled application program. Furthermore, the 3GPP layers generate a mapping table between the application layer ID and the types of representation code.

7. The ProSe-enabled application program requests the 3GPP layers to start a discovery procedure. That is, the ProSe-enabled application program requests the 3GPP layers to start discovery when one of provided 'friends' is placed in proximity to the UE A and direct communication is possible. The 3GPP layers announces the private representation code (i.e., in the above example, "GTER543 #2FSJ67DFSF", that is, the private representation code of adam@example.com) of the UE A. This is hereinafter called 'announcement'. Mapping between the application layer ID of the corresponding application program and the private representation code may be known to only 'friends' which have previously received such a mapping relation, and the 'friends' may perform such mapping.

8. It is assumed that the UE B operates the same ProSe-enabled application program as the UE A and has executed the aforementioned 3 to 6 steps. The 3GPP layers placed in the UE B may execute ProSe discovery.

9. When the UE B receives the aforementioned 'announce' from the UE A, the UE B determines whether the private representation code included in the 'announce' is known to the UE B and whether the private representation code is mapped to the application layer ID. As described the 8 step, since the UE B has also executed the 3 to 6 steps, it is aware of the private representation code, mapping between the private representation code and the application layer ID, and corresponding application program of the UE A. Accordingly, the UE B may discover the UE A from the 'announce' of the UE A. The 3GPP layers announce that adam@example.com has been discovered to the ProSe-enabled application program within the UE B.

In FIG. 13, the discovery procedure has been described by taking into consideration all of the types of UE A and B, the ProSe server, the APP server and so on. From the viewpoint of the operation between the types of UE A and B, the UE A sends (this process may be called announcement) a signal called announcement, and the UE B receives the announce and discovers the UE A. That is, from the aspect that an operation that belongs to operations performed by types of UE and that is directly related to another UE is only step, the discovery process of FIG. 13 may also be called a single step discovery procedure.

Figure 14:
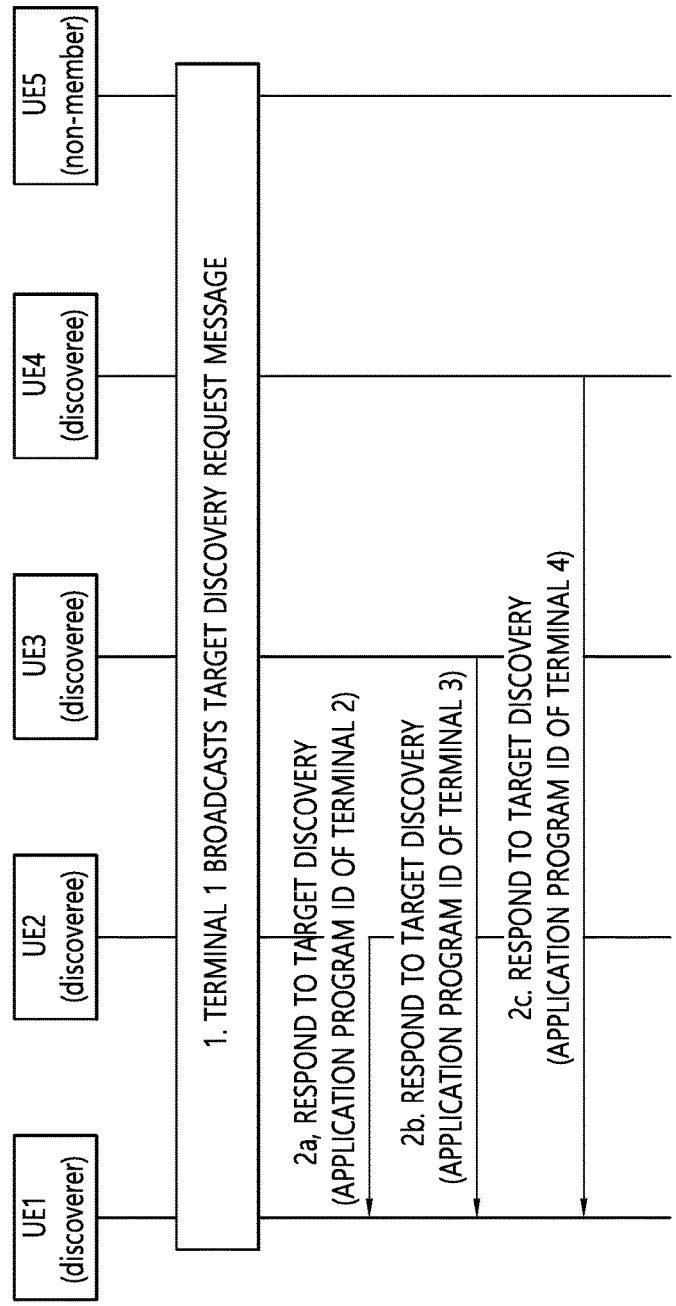
FIG. 14 is another embodiment of a ProSe discovery process.

FIG. 14 is another embodiment of a ProSe discovery process.

In FIG. 14, types of UE 1 to 4 are assumed to types of UE included in specific group communication system enablers (GCSE) group. It is assumed that the UE 1 is a discoverer and the types of UE 2, 3, and 4 are discoveree. UE 5 is UE not related to the discovery process.

The UE 1 and the UE 2-4 may perform a next operation in the discovery process.

First, the UE 1 broadcasts a target discovery request message (may be hereinafter abbreviated as a discovery request message or M1) in order to discover whether specific UE included in the GCSE group is in proximity. The target discovery request message may include the unique application program group ID or layer-2 group ID of the specific GCSE group. Furthermore, the target discovery request message may include the unique ID, that is, application program private ID of the UE 1. The target discovery request message may be received by the types of UE 2, 3, 4, and 5.

The UE 5 sends no response message. In contrast, the types of UE 2, 3, and 4 included in the GCSE group send a target discovery response message (may be hereinafter abbreviated as a discovery response message or M2) as a response to the target discovery request message. The target discovery response message may include the unique application program private ID of UE sending the message.

An operation between types of UE in the ProSe discovery process described with reference to FIG. 14 is described below. The discoverer (the UE 1) sends a target discovery request message and receives a target discovery response message, that is, a response to the target discovery request message. Furthermore, when the discoveree (e.g., the UE 2) receives the target discovery request message, it sends a target discovery response message, that is, a response to the target discovery request message. Accordingly, each of the types of UE performs the operation of the 2 step. In this aspect, the ProSe discovery process of FIG. 14 may be called a 2-step discovery procedure.

In addition to the discovery procedure described in FIG. 14, if the UE 1 (the discoverer) sends a discovery conform message (may be hereinafter abbreviated as an M3), that is, a response to the target discovery response message, this may be called a 3-step discovery procedure.

The present invention will now be described.

As described above, the UE supporting D2D operation may operate in any one of two modes with respect to resource allocation.

First, mode 1 is a mode in which an eNB schedules a resource for a D2D operation, and the UE must be in an RRC connection mode in order to transmit D2D data. The UE may request the D2D transmission resource to an eNB and the eNB may schedule the transmission resources for scheduling assignment and data transmission. The UE may transmit a BSR and a scheduling request (DSR) to the eNB. The BSR notifies the UE of data by D2D communication and at the same time allows the BS to estimate the resources required for the data transmission.

Mode 2 is a mode in which the UE itself selects a resource for D2D operation and selects resources for transmitting D2D data and scheduling allocation or the like in a configured resource pool.

For a UE in the RRC idle state, the eNB may 1) provide a transmission resource pool according to the mode 2 through an SIB (system information block). In this case, the UE may perform D2D communication using the mode 2 transmission resource pool in the RRC idle state. Or the eNB informs that it supports D2D operation and may not provide a configuration for resources for D2D communication in the SIB. In this case, the UE may not perform D2D communication in the RRC idle state, and may perform D2D communication after entering the RRC connection state.

The UE in the RRC connection state may inform the eNB that it wants to perform transmission according to D2D communication. The eNB may determine whether D2D communication of the UE is allowed/permitted/authorized using the context for the UE received from the MME.

The eNB may configure a transmission resource pool according to the mode 2 through a dedicated signal for the UE in the RRC connection state. The UE may use the transmission resource pool according to the mode 2 while it is in the RRC connection state without any specific limitation. Alternatively, the eNB may configure a resource pool according to the mode 2 that may be used only in an exceptional case through a dedicated signal for the UE in the RRC connection state. In the case of other than the exceptional case, the UE may perform D2D communication using the mode 1, i.e., resources allocated by the eNB.

Meanwhile, the UE may leave the RRC connection state for various reasons. For example, the UE leaves the RRC connection state when the eNB releases the RRC connection to the UE or if the RRC connection re-establishment procedure fails. The RRC connection re-establishment procedure may be regarded as a failure if T311 expires or a cell of another RAT is selected.

When the UE leaves the RRC connection state, it may perform the following operations.

For example, when leaving the RRC connection state, the UE 1) resets the MAC and 2) stops all timers running among the remaining timers except T320, T325, and T330. 3) Also, the UE releases all radio resources. The UE performs release of the RLC entity, release of the MAC configuration, release of the associated PDCP entity, etc. for all established radio bearers (RBs).

That is, when the UE leaves the RRC connection state, the UE releases all radio resource configurations including the D2D configuration. Therefore, if the UE performing the D2D operation leaves the RRC connection state, the continuity of the D2D operation may not be guaranteed.

In order to solve such a problem, in the present invention, it is proposed that, when a UE leaving the RRC connection state releases all radio resources, the entity associated with D2D communication and the configuration associated with D2D communication are excluded. That is, when the UE receives the D2D configuration on the D2D operation from the network and leaves the radio resource control (RRC) connection state, the UE may maintain, without releasing, the D2D configuration on the D2D operation.

Figure 15:
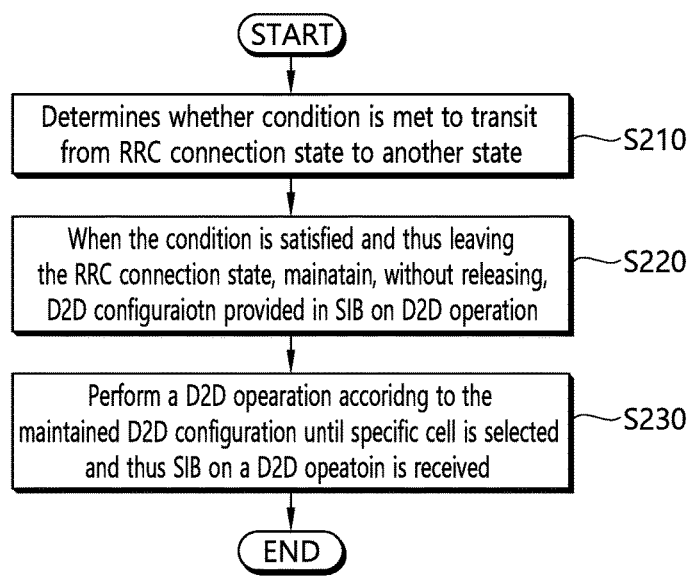
FIG. 15 shows a method of managing a configuration on the D2D operation of UE according to an embodiment of the present invention.

FIG. 15 shows a method of managing a configuration on the D2D operation of UE according to an embodiment of the present invention. The UE may be in a state that the D2D configuration associated with the D2D operation has already received from the eNB.

Referring to FIG. 15, the UE determines whether a transition condition from an RRC connection state to another state is satisfied (S210).

For example, the condition may be that the eNB has released the RRC connection to the UE or the UE has performed the RRC connection re-establishment procedure but failed to re-establish the RRC connection.

If the condition is satisfied and thus the UE leaves the RRC connection state, the UE does not release but maintain the D2D configuration on the D2D operation (S220).

The D2D configuration may be provided via a dedicated signal to the UE or via system information block (SIB) to be broadcasted.

The following table shows an example of a SIB (which may also be referred to as ProSe system information) that includes the D2D configuration for D2D operation.

TABLE 2

```
-- ASN1START
SystemInformationBlockType18-r12 ::= SEQUENCE {
    commConfig-r12              SEQUENCE {
        frequncyIndicator           SL-FrequencyIndication-r12
        commRxPool-r12              SL-CommRxPoolList-r12,
        commTxPoolNormalCommon-r12  SL-CommTxPoolList-r12
        OPTIONAL, -- Need OR
        commTxPoolExceptional-r12   SL-CommTxPoolList-r12
        OPTIONAL, -- Need OR
        commSyncConfig-r12          SL-SyncConfigList-r12
    OPTIONAL -- Need OR
    }
                                    OPTIONAL, -- Need
    OR
    lateNonCriticalExtension        OCTET STRING
        OPTIONAL,
    ...
}
-- ASN1STOP
```

In the above table, 'frequencyIndicator' is a frequency indicator indicating the frequency to which 'commConfig' applies. 'CommRxPool' in 'commConfig' indicates resources allowed to receive signals on D2D communication in RRC idle state and RRC connection state. 'CommTxPoolNormalcommon' indicates a resource that is allowed to transmit a signal on D2D communication at a frequency other than a specific frequency in an RRC idle state or an RRC connection state. 'CommTxPoolExceptional' indicates a resource that is allowed to transmit signals on D2D communication under exceptional conditions. That is, the network may inform the UE of the D2D resources that may be used for D2D operation and the frequencies where the D2D resources may be used.

That is, the SIB on the D2D operation may inform at least one of a resource (resource pool) that can be used for transmission of the D2D signal usable in the mode 2, and a resource (resource pool) that can be used for receiving the D2D signal.

The UE selects a specific cell and performs a D2D operation according to the maintained D2D configuration until receiving a SIB related to a D2D operation from the selected cell (S230). For example, suppose a UE is in RRC connection state with cell 1 and receives a D2D configuration from cell 1. As an example, the UE may assume that it has received a D2D configuration from the cell 1 via the SIB as shown in Table 2. As another example, it may be assumed that the UE has received a D2D configuration similar to Table 2 from the cell 1 via the UE dedicated signal. If the UE performed but has failed the RRC connection re-establishment procedure due to a problem with the radio link with the cell 1, the UE may leave the RRC connection state and enter the RRC idle state. In this case, the UE maintains the D2D configuration without releasing it. Also, the UE may perform a D2D operation using the D2D configuration received in the cell 1 until it camped on another cell, e.g., the cell 2 and receives a SIB containing a D2D configuration provided by the cell 2.

In the above example, if cell 1 provides a configuration for the D2D receiving resource pool via the SIB or UE dedicated signal, the UE may continue receiving D2D under certain conditions even if leaving the RRC connection state in relation to the cell 1. Also, if the cell 1 provides a configuration for the D2D transmission resource pool through the SIB or the UE dedicated signal, the UE may continue the D2D transmission under a certain condition even when leaving the RRC connection state in relation to the cell.

In the above example, it is also possible to receive a configuration of a separate D2D configuration from cell 1 that may be applied after the UE leaves the RRC connection state in relation to cell 1. If the UE receives the separate D2D configuration from the SIB of cell 1 or from the cell 1 via the UE-dedicated signal, and leaves the RRC connection state, the UE may continue the D2D operation without interruption by using the separate D2D configuration.

In the above example, it may be necessary to limit the operation of performing the D2D operation to a specific condition by applying the D2D configuration after the UE receives the D2D configuration from cell 1 and leaves the RRC connection state. For example, it may be desirable that the operation of using the D2D configuration received by the UE in the cell 1 even when the UE is not connected to the cell 1 is allowed to be exceptionally allowed only for a certain amount of time to the maximum extent. To this end, the UE initiates a timer when leaving the RRC connection state, and may perform the D2D operation by applying the D2D configuration during the time indicated by the timer (or limited to the time indicated by the timer). The time of the timer may be configured by the network or it may be a predetermined value.

If the D2D configuration having received from the existing cell continues to be used even after a certain time has elapsed since the UE left the RRC connection state, then it may cause significant interference to the network and thus the D2D configuration received from the existing cell is used for a certain period of time.

After selecting the regular cell (cell 2) in the RRC idle state, the UE may receive the system information including the D2D configuration applicable in the RRC idle state through the cell 2. If there is a configuration for the mode 2 receiving resource pool in the system information, the UE will be able to receive D2D communication using the mode 2 receiving resource pool in the RRC idle state. Further, if the system information includes a configuration for the mode 2 transmission resource pool, the UE may transmit a signal according to the D2D communication using the mode 2 transmission resource pool in the RRC idle state.

According to the method of FIG. 15, the continuity of the D2D operation is guaranteed even if the UE leaves the RRC connection state during the D2D operation. More specifically, the D2D operation may be continued until the UE completes the cell selection procedure while leaving the RRC connection state. The D2D operation may be a D2D communication.

Hereinafter, a cell selection will be described when leaving the RRC connection state.

Upon receiving the RRC connection release message, the UE may change the state from the RRC connection state to the RRC idle state. In this case, a field 'redirectedCarrierInfo' may be included in the RRC connection release message. The 'redirectedCarrierInfo' may include a list of frequencies that the UE may attempt to camp on. If the field 'redirectedCarrierInfo' is included in the RRC connection release message, the UE may find a regular cell to camp on at any one of the frequencies indicated by the 'redirectedCarrierInfo'.

However, it may be occurred that the UE is interested in D2D communication and the there is no frequency at which D2D communication is available among the frequencies indicated by the 'redirectedCarrierInfo'. In this case, UE may ignore 'redirectedCarrierInfo' and search for another frequency capable of D2D communication. The frequency at which D2D communication is available may be informed to the UE in advance.

If there is any frequency at which D2D communication is available among the frequencies indicated by the 'redirectedCarrierInfo', the priority of the corresponding frequency may be configured to the highest priority.

Meanwhile, if the UE may not find a regular cell at the frequencies indicated by 'redirectedCarrierInfo', the UE may be allowed to camp on any regular cell of the indicated RAT.

If 'redirectedCarrierInfo' is not included in the RRC connection release message, the UE may select a regular cell at the EUTRA carrier frequency.

If the regular cell is not found in the procedure, the UE may perform cell selection using information stored in the UE itself to search for a regular cell to camp on.

If the RRC connection release message includes 'redirectedCarrierInfo' in the case of returning back to the RRC idle state after returning to the RRC connection state from the any cell camped on state, then the UE may try to camp on to find any acceptable cell of the indicated by the 'redirectedCarrierInfo'. If the UE does not find the acceptable cell, the UE may be allowed to camp on any acceptable cell of the indicated RAT.

If the RRC connection release message does not include 'redirectedCarrierInfo', the UE may attempt to select an acceptable cell at the EUTRA carrier frequency. If no acceptable cell is found, the UE may find an acceptable cell of any PLMN in a random cell selection state.

In cell selection/reselection for changing a cell, the UE may inform a higher layer of the UE itself whether or not it may perform D2D communication. The UE may notify the higher layer only when the state is changed as compared with the previously announced state.

The UE may initiate the RRC connection re-establishment procedure if one of the following conditions is met:

If 1) the radio link failure is detected, 2) the handover fails, 3) transition from the EUTRA failure, 4) the lower layer reports the integrity check failure, and 5) the RRC connection reconfiguration fails etc., is occurred, then the re-establishment procedure may be initiated.

Figure 16:
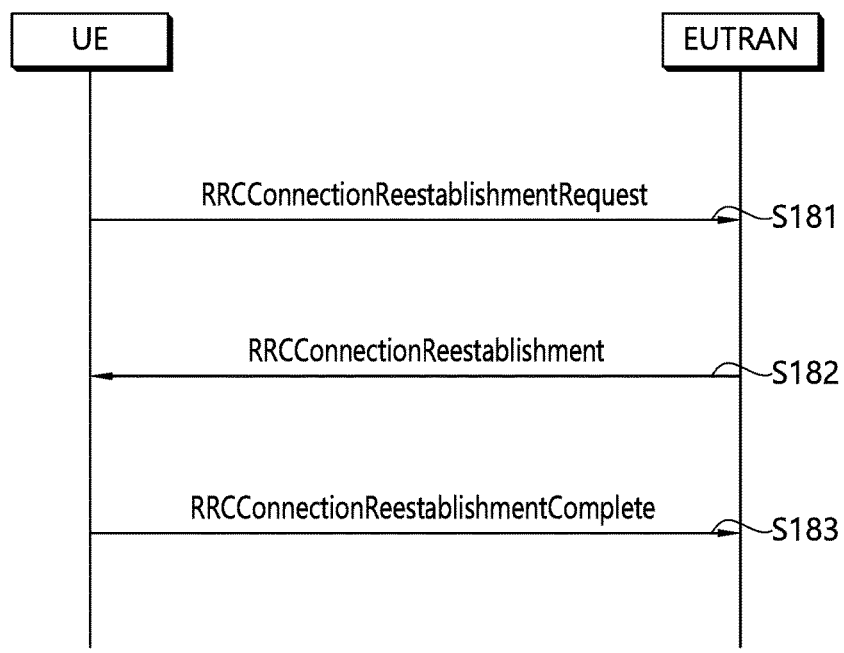
FIG. 16 shows a case where the RRC connection re-establishment procedure is successful.

FIG. 16 shows a case where the RRC connection re-establishment procedure is successful.

Referring to FIG. 16, the UE transmits an RRC connection reestablishment request (RRCConnectionReestablishmentRequest) message to the EUTRAN (S181). The RRC connection re-establishment procedure may be caused by a radio link failure (RLF) or a handover failure. The RRC connection re-establishment request message may include information indicating the cell ID, the UE ID, and the cause of re-establishment where the RLF, the handover failure or the like is occurred.

The network transmits an RRC connection reestablishment (RRCConnectionReestablishment) message to the UE (S182).

If the RRC connection re-establishment procedure is successfully performed, the UE transmits an RRC connection re-establishment completion (RRCConnectionReestablishmentComplete) message (S183).

Figure 17:
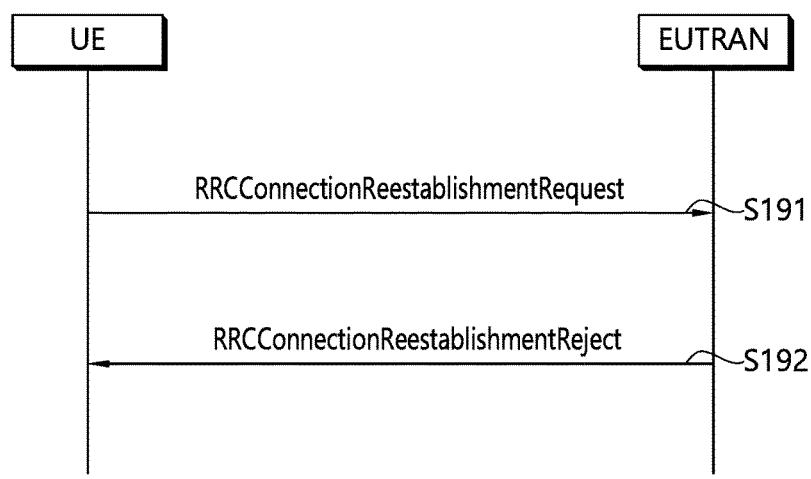
FIG. 17 shows a case where the RRC connection re-establishment procedure fails.

FIG. 17 shows a case where the RRC connection re-establishment procedure fails.

Referring to FIG. 17, the UE transmits an RRC connection re-establishment request message to the network (S191).

The network transmits an RRC connection reestablishment rejection (RRConnectionReestablishmentReject) message to the UE (S192).

When the UE initiates the RRC connection re-establishment procedure, it may perform the operation as shown in the following table.

TABLE 3

1> stop timer T310, if running;
1> stop timer T312, if running;
1> start timer T311;
1> suspend all RBs except SRB0;
1> reset MAC;
1> release the SCell(s), if configured, in accordance with 5.3.10.3a;
1> apply the default physical channel configuration as specified in 9.2.4;
1> apply the default semi-persistent scheduling configuration as specified in 9.2.3:
1> apply the default MAC main configuration as specified in 9.2.2;
1> release *powerPrefIndicationConfig*, if configured and stop timer T340, if running;
1> release *reportProximityConfig* and clear any associated proximity status reporting timer;
1> release *obtainLocationConfig*, if configured:
1> release *ide-Config*, if configured;
1> release *measSubframePatternPCell*, if configured;
1> if connected as an RN and configured with an RN subframe configuration:
   2> release the RN subframe configuration;
1> perform cell selection in accordance with the cell selection process as specified in TS 36.304 [4];
1> Keep the configuration for D2D communication.

The differences distinctive from the prior art in the table is that the UE maintains the configuration for D2D (e.g., D2D communication) operation ("Keep the configuration for D2D Communication") in the RRC connection re-establishment process as shown at the last part.

If the remaining operations may be performed in the same manner such that if T310 is in operation, then T310 is stopped, while if T312 is in operation, then T312 is stopped, T311 is started, all RBs except SRB0 are stopped, and MAC is reset, and if the secondary cell has been configured, the secondary cell is released, a default physical channel configuration is applied, a default semi-static scheduling configuration is applied, and a default MAC main configuration is applied, 'powerPrefIndicationConfig', 'reportProximity-Config', 'obtatinLocationConfig', 'idc-Config', 'measSubframePatternPCell' or the like is released, and if there is a connection with the relay station and there is a subframe configuration for the connection, then the subframe configuration is released, and the cell reselection is performed.

The above T310, 311, 312 is as follows.

Hereinafter, a cell selection/reselection process of a UE will be described by considering system information on D2D operation.

The UE interested in D2D communication may consider a configuration for D2D communication, e.g., SIB 18 in Table 2 as essential system information. Therefore, when the UE interested in D2D communication at a specific frequency attempts to camp on a cell of the carrier of the specific frequency, considers the system information including the configuration on the D2D communication as the essential system information.

Figure 18:
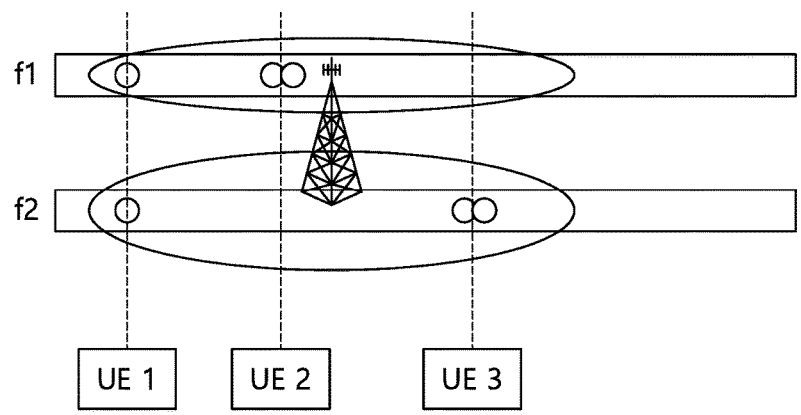
FIG. 18 shows an example of a serving frequency and a frequency for performing D2D operation on a UE-by-UE basis.

FIG. 18 shows an example of a serving frequency and a frequency for performing D2D operation on a UE-by-UE basis.

Referring to FIG. 18, UE 1 has f1 frequency as the serving frequency and f2 frequency as the ProSe frequency for performing the D2D operation. UE 2 has f2 frequency as both the serving frequency and the ProSe frequency for performing the D2D operation. UE 3 has the f1 frequency as both the serving frequency and the ProSe frequency for performing the D2D operation.

Figure 19:
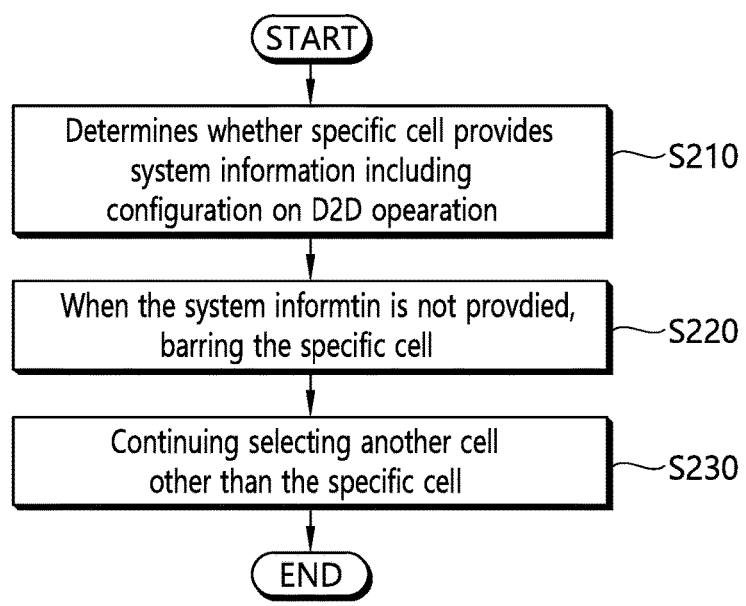
FIG. 19 illustrates a cell selection method of a UE according to an embodiment of the present invention.

FIG. 19 illustrates a cell selection method of a UE according to an embodiment of the present invention.

Referring to FIG. 19, the UE determines whether a specific cell provides system information including a configuration on a D2D operation (S310).

If the specific cell does not provide the system information, the UE bars the specific cell (S320). Barring the specific cell means that the UE excludes the specific cell from the RRC connection target cell, and as a result, the UE is excluded from the cell selection target.

The UE continues to select a cell that is not the specific cell (S330).

The UE finds that the cell that has attempted to camp-on in the RRC idle state does not provide the system information including the configuration on the D2D operation (e.g., as described in the above table 2, such system information may be referred to as ProSe system information), then the cell is barred, and another cell may be found.

For example, if the UE finds that the cell that is attempted to be camped on in the RRC idle state does not support D2D communication at all, then it may bar the cell and find another cell.

If the cell in the RRC connection state does not support the D2D communication through the RRC connection re-

TABLE 4

| Timer | Start | Stop | At expiry |
|---|---|---|---|
| T310 | Upon detecting physical layer problems for the PCel) | Upon receiving N311 consecutive in-sync indications from lower layers for the PCell, upon triggering the handover procedure and upon initiating the connection re-establishment procedure | If security is not activated: go to RRC_IDLE else: initiate the connection re-establishment procedure |
| T311 | Upon initiating the RRC connection re-establishment procedure | Selection of a suitable E-UTRA cell or a cell using another RAT | Enter RRC_IDLE state |
| T312 | Upon triggering a measurement report for a measurement identity for which T312 has been configured, while T310 is running | Upon receiving N311 consecutive in-sync indications from lower layers, upon triggering the handover procedure, upon initiating the connection re-establishment procedure, and upon the expiry of T310 | If security is not activated: go to RRC_IDLE else: initiate the connection re-establishment procedure | establishment procedure, the UE releases the RRC connection and enters the RRC idle state. Or the UE may ignore the cell or consider that the cell is barred, and it may continue the cell selection procedure. Whether the D2D communication is supported or not, may be indicated by SIB 1 or SIB 2. For example, it may be indicated through a separate indicator indicating whether the D2D communication is supported or not. As another example, a D2D communication configuration may be indicated through which the system information (e.g., SIB 18) is scheduled or not.

If the UE, which is the RRC connection state, identifies that the specific cell that the UE tried to connect does not provide ProSe system information, the UE may release the RRC connection and enter the RRC idle state. Or, the UE may ignore the cell or consider that the cell is barred and continue the cell selection procedure.

If the UE moves to the RRC idle state, the UE may perform priority handling by itself. The basic principle of priority handling of the UE itself is to consider the frequency that the UE is interested in as having the highest priority under a certain condition.

For example, in the case of a closed subscriber group (CSG), the certain condition is that the UE must be a CSG member of a cell. In case of MBMS, the certain condition is the capability of the UE and the MBMS related SIB broadcast state. The condition definition is important in terms of 1) limiting the application of priority handling by the UE itself and 2) ensuring continuity of the service of interest.

The same principle may be applied to reselection of the D2D frequency. If the UE is interested in D2D communication and should camp on the frequency at which D2D communication is to be performed and thus is able to perform D2D communication, the UE may consider the frequency as the highest priority frequency during the D2D communication session.

According to the method of FIG. 19, a cell not providing ProSe system information is not selected in the cell selection/reselection process of the UE. That is, only the cell providing the ProSe system information is selected in the cell selection/reselection process of the UE. If the cell providing the ProSe system information in the cell selection/reselection process is selected within the acceptable time, no problem in the continuity of the D2D operation is occurred. Even if the cell providing the ProSe system information is not selected within a predetermined time and leaves the RRC connection state, the UE maintains the D2D configuration (D2D configuration having provided by the ProSe system information of the existing cell) having received from the existing cell, and thus the D2D operation may be performed using the D2D configuration.

Figure 20:
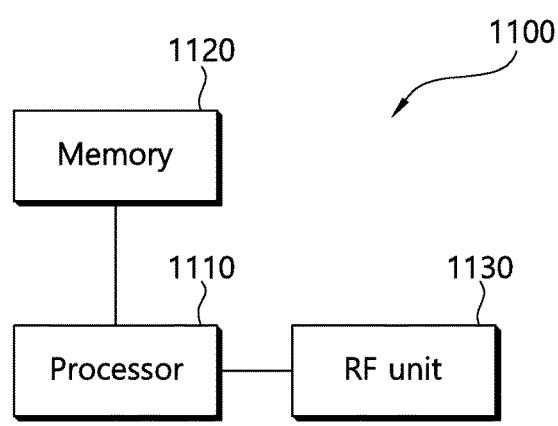
FIG. 20 is a block diagram showing a UE in which an embodiment of the present invention is implemented.

FIG. 20 is a block diagram showing a UE in which an embodiment of the present invention is implemented.

Referring to FIG. 20, a UE 1100 includes a processor 1110, a memory 1120, and a radio frequency unit (RF) unit 1130. Processor 1110 implements the proposed functionality, process and/or method. For example, the processor 1110 may receive a D2D configuration on the D2D operation from a network, and maintaining, without releasing, the D2D configuration on the D2D operation, when leaving a RRC (radio resource control) connection state. For example, the processor 1110 determines whether a condition to transit from the RRC connection state to another state is satisfied, and may maintain, without releasing, the D2D configuration provided in system information on the D2D operation, when the condition is satisfied and thus leaving the RRC connection state.

The RF unit 1130 is connected to the processor 1110 and sends and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for managing a configuration for device-to-device (D2D) operation of a user equipment (UE) in a wireless communication system, the method comprising:
   receiving a D2D configuration on the D2D operation from a network;
   maintaining, without releasing, the D2D configuration on the D2D operation, when the UE leaves a RRC (radio resource control) connection state; and
   performing the D2D operation based on the D2D configuration on the D2D operation, after the UE leaves the RRC connection state,
   wherein when the UE leaves the RRC connection state, the UE releases all radio resources except radio resources for the D2D operation.

2. The method of claim 1, further comprising:
   determining whether a condition to transit from the RRC connection state to another state is satisfied,
   wherein the condition is characterized in that the network releases the RRC connection on the UE, or the UE fails a RRC connection reconfiguration with the network.

3. The method of claim 1, wherein the D2D operation is performed by applying the maintained D2D configuration until the UE selects a specific cell and receives system information on a D2D operation from the selected specific cell.

4. The method of claim 3, wherein a cell which does not provide system information on a D2D operation is barred, in selecting the specific cell.

5. The method of claim 3, wherein the specific cell is selected from cells which provide system information on a D2D operation.

6. The method of claim 1, wherein when the UE leaves a RRC connection state, a timer is started, and the UE performs a D2D operation by applying the D2D configuration only for a time duration indicated by the timer.

7. The method of claim 1, wherein the network provides an additional D2D configuration other than the D2D configuration, and the additional D2D configuration is available to use after the UE releases a RRC connection state.

8. The method of claim 1, wherein the D2D operation is a D2D communication.

9. The method of claim 1, wherein the UE maintains the D2D configuration on the D2D operation in a RRC connection re-establishment process.

10. A user equipment (UE) comprising:
    a transmitter and receiver; and
    a processor operatively connected to the RF unit, and configured to be operated, and
    wherein the processor is configured to:

control the receiver to receive a D2D configuration on the D2D operation from a network;
maintain, without releasing, the D2D configuration on the D2D operation, when the UE leaves a RRC (radio resource control) connection state,
perform the D2D operation based on the D2D configuration on the D2D operation, after the UE leaves the RRC connection state,
wherein when the UE leaves the RRC connection state, the UE releases all radio resources except radio resources for the D2D operation.

* * * * *